(12) United States Patent
Springer

(10) Patent No.: US 6,311,352 B1
(45) Date of Patent: Nov. 6, 2001

(54) SELF-UNLATCHING DOCK LEVELER LIP WITH DAMPENED DESCENT

(75) Inventor: Scott L. Springer, Menomonie, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/360,278

(22) Filed: Jul. 26, 1999

(51) Int. Cl.[7] ............................................. E01D 1/00
(52) U.S. Cl. ............................. 14/71.5; 14/69.5; 14/71.7
(58) Field of Search .................................... 14/71.5, 69.5, 14/71.1, 71.3

(56) References Cited

U.S. PATENT DOCUMENTS

| | | | |
|---|---|---|---|
| 3,117,332 | 1/1964 | Kelley | 14/71 |
| 3,606,627 | 9/1971 | Potter | 14/71 |
| 3,685,076 * | 8/1972 | Loblick | 14/71.7 |
| 3,995,342 * | 12/1976 | Wiener | 14/71.3 |
| 3,997,932 | 12/1976 | Artzberger | 14/71.3 |
| 4,091,488 * | 5/1978 | Artzberger | 14/71.7 |
| 4,364,137 | 12/1982 | Hahn | 14/71.3 |
| 4,398,315 | 8/1983 | Driear et al. | 14/71.3 |
| 4,944,062 * | 7/1990 | Walker | 14/71.7 |
| 5,123,135 * | 6/1992 | Cook et al. | 14/17.7 |
| 5,205,010 * | 4/1993 | Hageman | 14/71.7 |
| 5,416,941 * | 5/1995 | Hageman | 14/71.7 |
| 5,526,545 * | 6/1996 | Alexander | 14/71.7 |
| 5,544,381 * | 8/1996 | Alexander | 14/71.7 |
| 5,832,554 * | 11/1998 | Alexander | 14/71.3 |
| 6,122,353 * | 9/2000 | Winter | 14/71.3 |

* cited by examiner

Primary Examiner—Thomas B. Will
Assistant Examiner—Kristine Markovich
(74) Attorney, Agent, or Firm—Marshall, Gerstein & Borun

(57) ABSTRACT

A dock leveler ramp with a lip that can be latched in an extended position to ensure that the lip comes to rest upon the back end of a vehicle as the ramp descends includes an unlatching mechanism. The mechanism positively unlatches the lip by direct force created by the lip engaging the vehicle or created by the ramp descending upon an internal abutment in the event that a vehicle is not present. Also, the descent of an unlatched lip is dampened to prevent the lip from slamming back down to its pendant position.

39 Claims, 10 Drawing Sheets

SELF-UNLATCHING DOCK LEVELER LIP WITH DAMPENED DESCENT

BACKGROUND OF THE INVENTION

1. Field Of The Invention

The subject invention generally relates to dock levelers, and more specifically, to dock levelers having a lip extension.

2. Description Of Related Art

Dock levelers are often used to compensate for a height difference that may exist between a loading dock platform and the bed of a truck parked at the dock. A dock leveler typically includes a ramp that is hinged at its back edge to raise or lower its front edge to generally match the height of the truck bed. Often an extension plate or lip is pivotally coupled to the ramp to bridge the gap between the ramp's front edge and a back edge of the truck bed. The ramp and lip provide a path for forklift trucks to travel from the loading dock platform and onto the truck bed, thus facilitating loading or unloading the truck.

For some dock levelers, the operating sequence involves pivoting the ramp upward to a height that allows the lip to pivot outward so it can extend over the back edge of the truck bed without striking it. The extended position of the lip can be latched to the ramp to allow the ramp enough time to descend and thus place the extended lip upon the truck bed. A contact force between the truck bed and the underside of the lip can be used to unlatch it, so when the truck departs, the unlatched lip is free to swing down.

An example of a latching-style dock leveler can be found in U.S. Pat. No. 3,997,932. It appears that a ramp pivots upward to its peak height, while the lip remains hanging downward in its pendant position. Then as the ramp pivots back down, a bar 23 forces linkages 14 and 17 to start lifting the lip. As the ramp continues downward, the lip continues to pivot outward and eventually latches as linkages 14 and 17 toggle over-center. The action of the lip engaging the bed of a truck unlatches the lip. When the truck departs, it appears that the lip falls freely. The resulting slamming action could be startling, unsafe, and possibly shorten the life of the dock leveler. Another problem exists when the ramp descends, but the lip misses the bed of the truck (e.g., no truck is present). It appears that the ramp would fully descend while leaving the lip extended. The next truck to arrive at the dock might back into the extended lip to damage both the truck and the dock leveler.

The '932, latching device is also incorporated in the dock levelers of U.S. Pat. Nos. 4,398,315 and 5,416,941. However, the '315 dock leveler adds a break-away coupling (FIGS. 3, 4 and 5) that buckles in the event that a truck backs into a lip that was left latched in an extended position. This might minimize damage to the truck and dock leveler in the event of a collision; however, it might be better to avoid the collision entirely. It appears that neither the '315 nor the '941 dock levelers address the problems associated with a lip being able to free-fall.

A latching dock leveler described in U.S. Pat. No. 4,091,488 addresses the free-fall problem, but in doing so introduces yet another problem. An additional link (item 54) is added to latch the lip. To unlatch the lip, link 54 needs to swing down away from item 58. It appears that the only force urging link 54 to swing down is its own weight. And that may be insufficient if link 54 were to seize on some dirt, corrosion, or otherwise bind where link 54 pivots on bracket 55 or possibly where link 54 engages item 58. Such binding could create all the problems normally associated with a lip left in its latched extended position after the truck departs.

Similarly, U.S. Pat. No. 3,995,342 also includes a separate additional link (item 32) to hold the lip in a latched state. Link 32 would appear to be susceptible to the forementioned problems of link 54 of the '488 device. Moreover, the '342 dock leveler also appears to allow its lip to fall freely without controlled descent.

Although some of the above-mentioned dock levelers have latching lips that are unlatched by the lip engaging the vehicle, the lip/vehicle engagement only triggers the unlatching motion as opposed to forcing it. Thus, additional mechanisms are needed, such as springs or weight, to provide the unlatching force.

SUMMARY OF THE INVENTION

In order to provide a dock leveler with a positive unlatching mechanism for an extended latched lip, the mechanism unlatches by direct force created by the lip engaging the vehicle or created by the dock leveler descending upon an internal abutment in the event that a vehicle is not present.

In some embodiments, the descent of an unlatched lip is dampened to provide a smooth, safe operation.

In some embodiments, the unlatching mechanism includes one element that not only exerts a force that holds the lip in a latched condition, but also alternately exerts another lower force that allows the lip to descend at a controlled speed.

A positive unlatching mechanism, as provided by a preferred embodiment, might be more reliable than having to rely on spring force to pull relatively small linkages into position or relying on their weight alone to unlatch the lip.

DESCRIPTION OF THE PREFERRED EMBODIMENT

Figure 1:
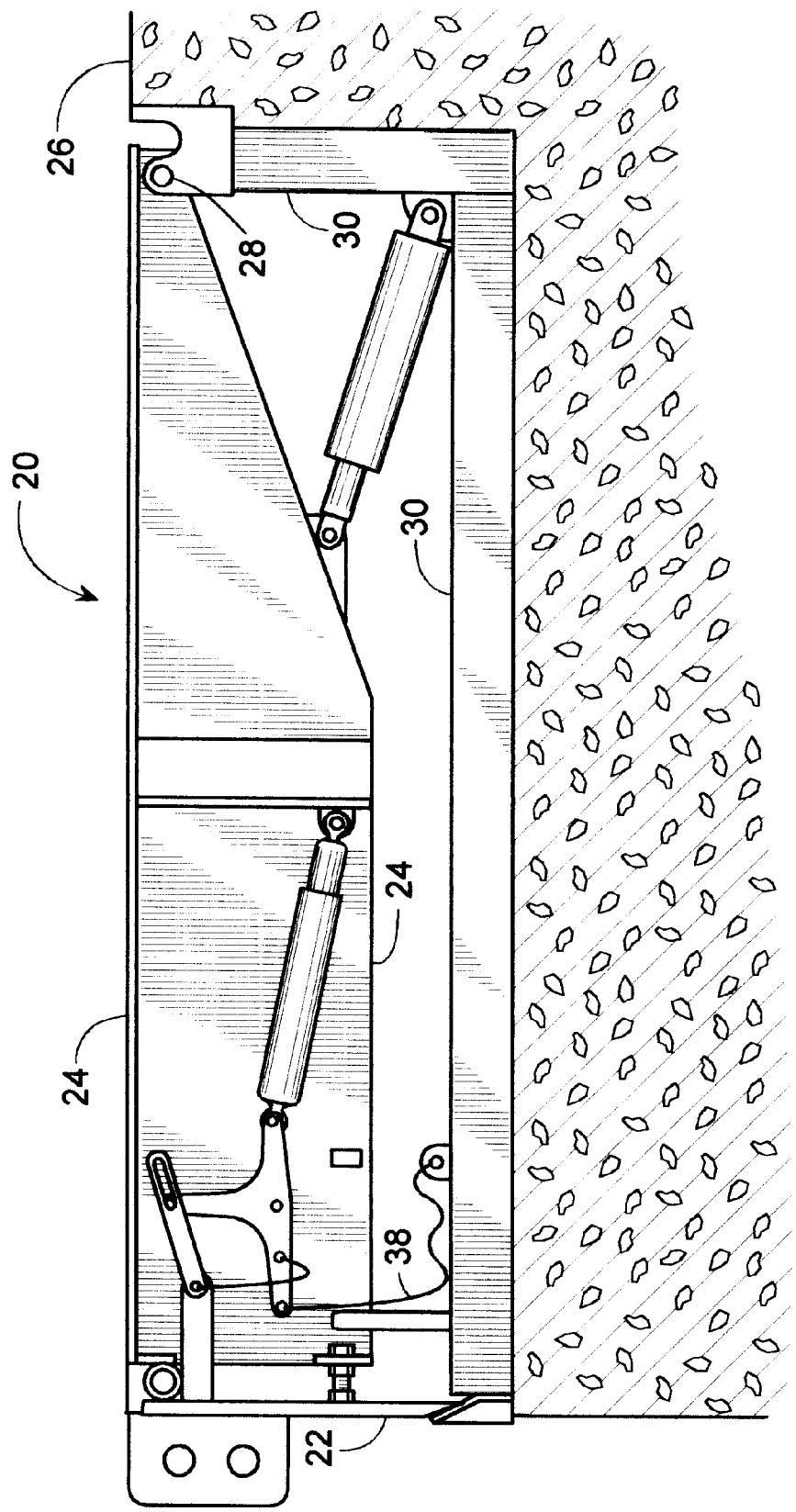
FIG. 1 is a cut-away side view of one exemplary embodiment of a dock lever in its standby position.

One example of dock leveler that forcibly unlatches its extended lip by the force generated at a distal end of the lip upon engaging the vehicle is shown in FIG. 1. In this figure, a dock leveler 20 is shown in standby with its pivoting lip 22 stored and its pivoting ramp 24 generally flush with an upper level of a loading dock 26.

Figure 2:
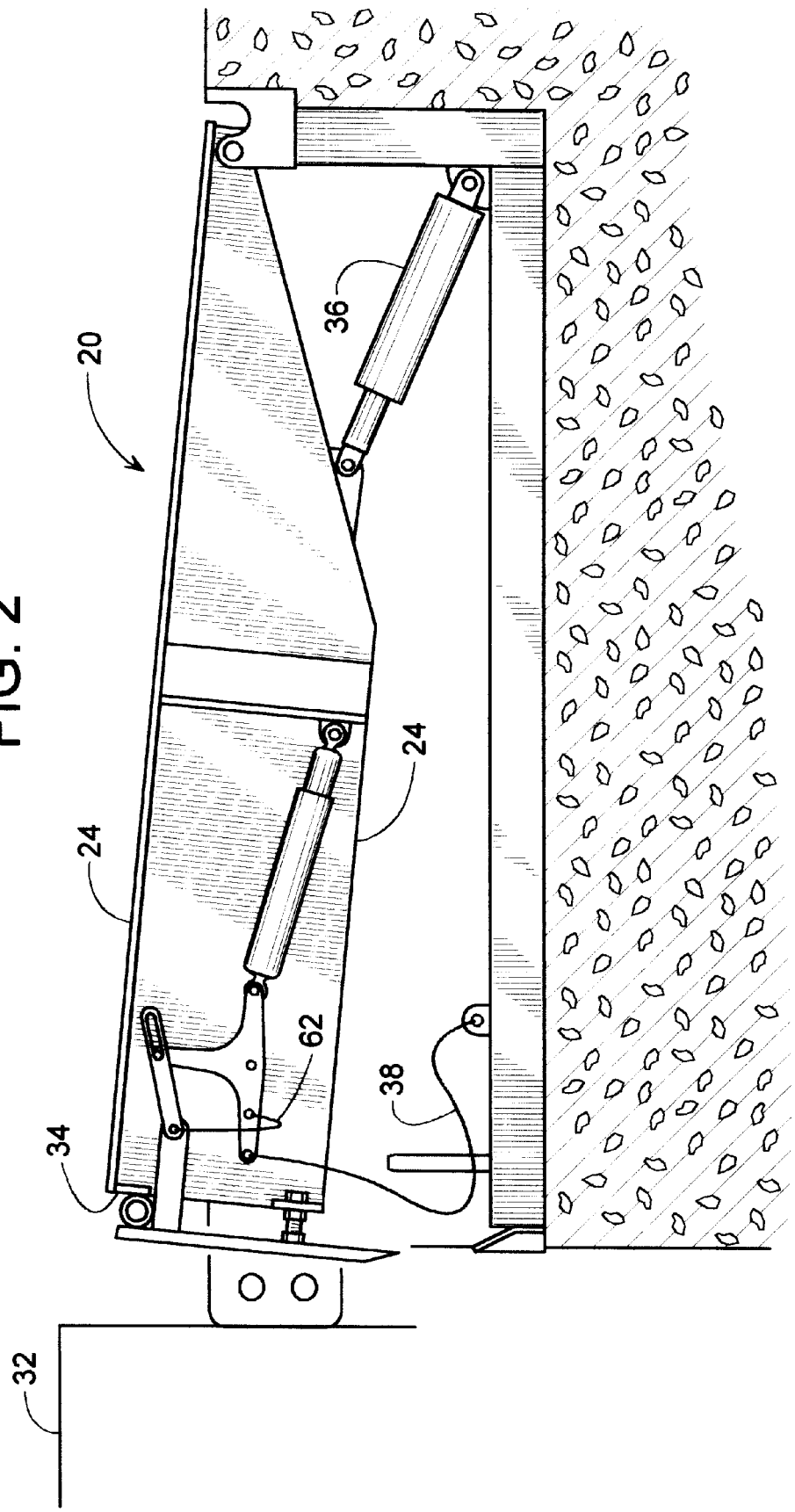
FIG. 2 shows the ramp of a dock leveler beginning to rise.

When a vehicle 32, such as a truck, arrives at dock 26, ramp 24 pivots upward about a hinge 28 connected to a frame 30. This starts raising a front edge 34 of ramp 24, as shown in FIG. 2. In this case, a lifting device 36 is employed to assist the upward pivotal motion of ramp 24. Examples of lifting device 36 include, but are not limited to, a hydraulic cylinder, a pneumatic cylinder, an air bag or a spring (gas or mechanical).

Figure 3:
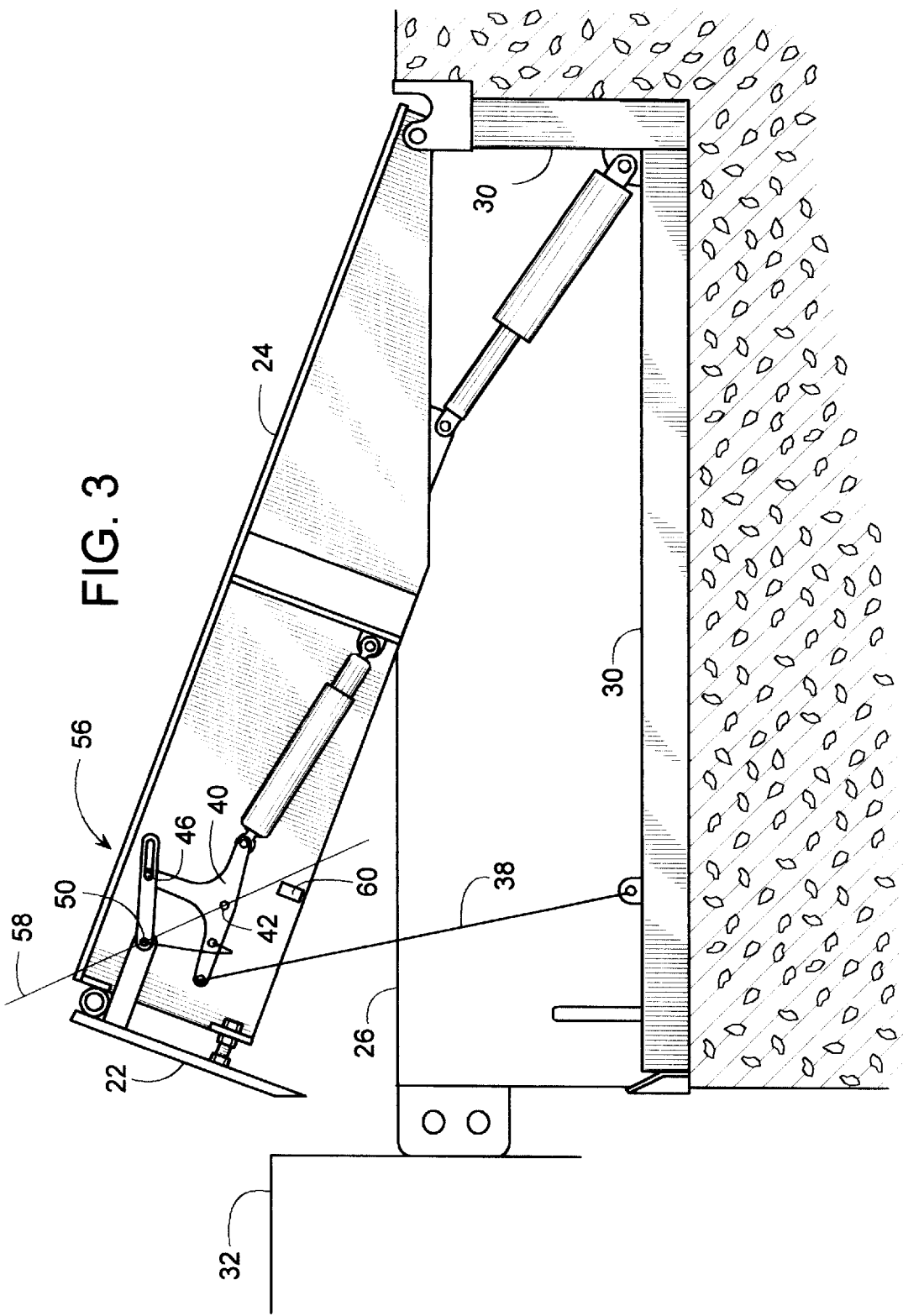
FIG. 3 shows a dock leveler's subbing cable just as it becomes taut.

Ramp 24 continues to rise, which tightens an elongated snubbing member 38, as shown in FIG. 3. In this example, snubbing member 38 connects a main link 40 to frame 30 and can be any one of a variety of elongated members. Some examples of snubbing member 38 would include, but not be limited to, a cable, a chain, a strap, or even a sliding rod or link with a slot.

Figure 4:
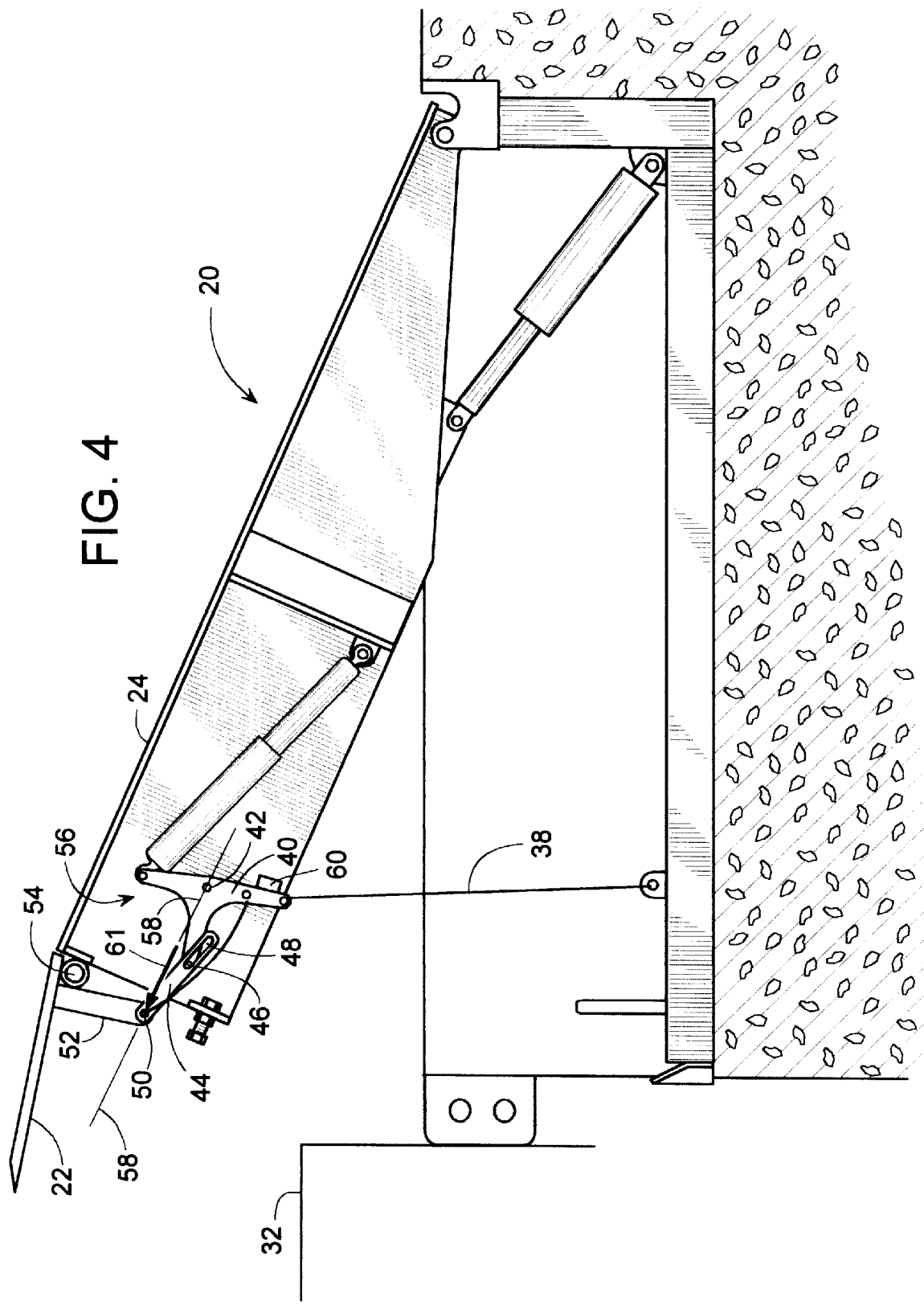
FIG. 4 shows the dock leveler's lip in a latched mode.

Once snubbing member 38 is taut, ramp 24 continuing to pivot upward causes snubbing member 38 to pull main link 40 counter clockwise, as shown in FIG. 4. Main link 40 rotates about an axis 42 whose position is fixed relative to ramp 24 by way of a conventional bracket. Such a bracket is well known by those skilled in the art and is only schematically incorporated in the illustration of axis 42 to more clearly show the operation of dock leveler 20. Rotational motion of main link 40 drives a lip link 44 by way of a pin 46 engaging the end of a slot 48 of lip link 44. A second pin 50 couples lip link 44 to a lip lug 52 that rigidly extends from lip 22. Thus, lip 22 pivots (in relation to ramp 24) about a hinge 54 in response to main link 40 rotating.

In one exemplary embodiment, main link 40, in conjunction with lip link 44 provides a toggle-over-center mechanism 56 that latches lip 22 in an extended position prior to ramp 24 descending. In FIG. 3, mechanism 56 is first shown in an unlatched configuration with pin 46 generally above a line 58 that is defined by axis 42 and pin 50. Then, as main link 40 rotates to the position shown in FIG. 4, pin 46 moves generally below line 58 to place mechanism 56 in an over-toggle, latched configuration. To avoid making it too difficult to unlatch, a stop 60 is fixed relative to ramp 24 to prevent mechanism 56 from over-traveling in its latched configuration.

Figure 5:
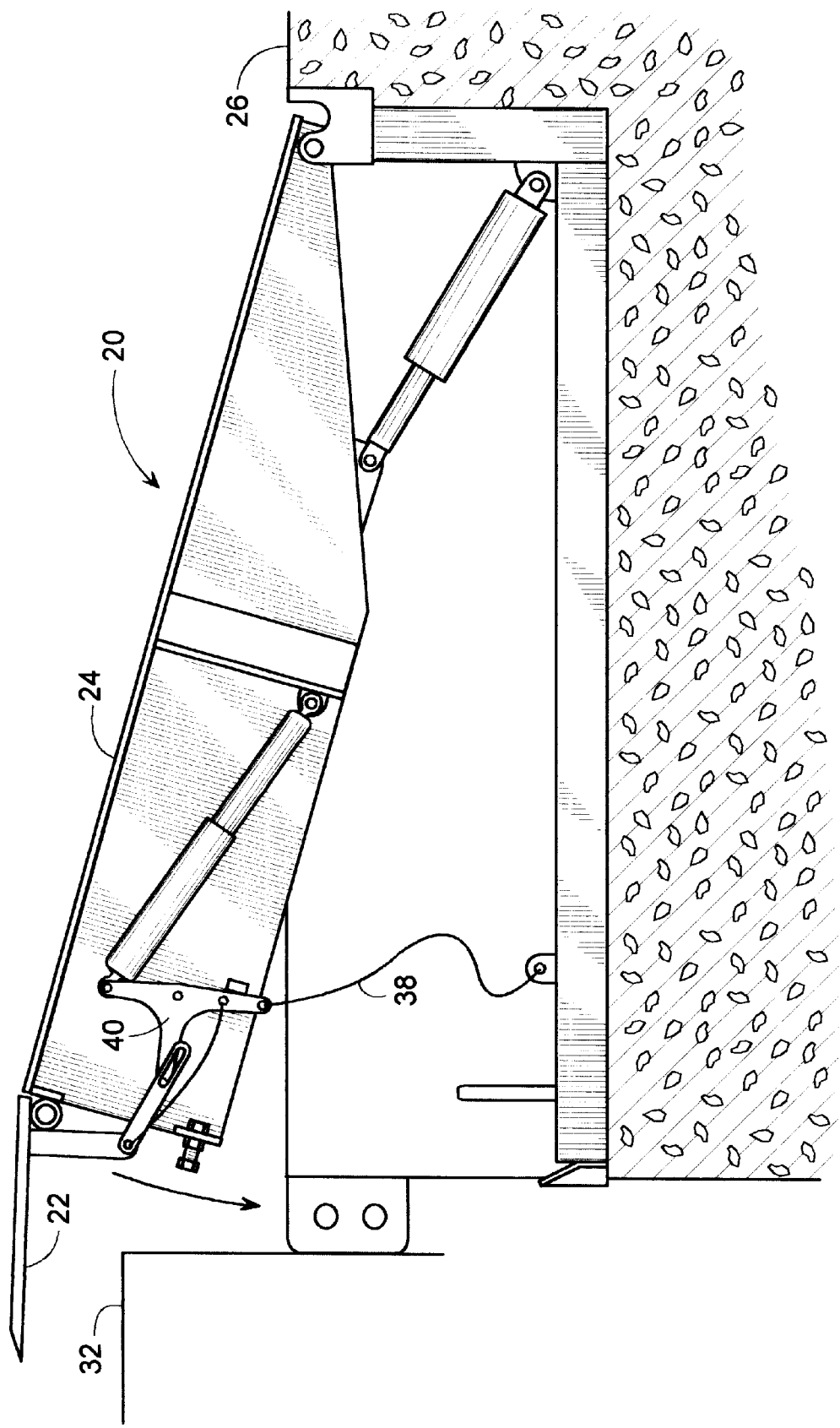
FIG. 5 shows the ramp about to rest the latched lip upon a truck bed.
Figure 6:
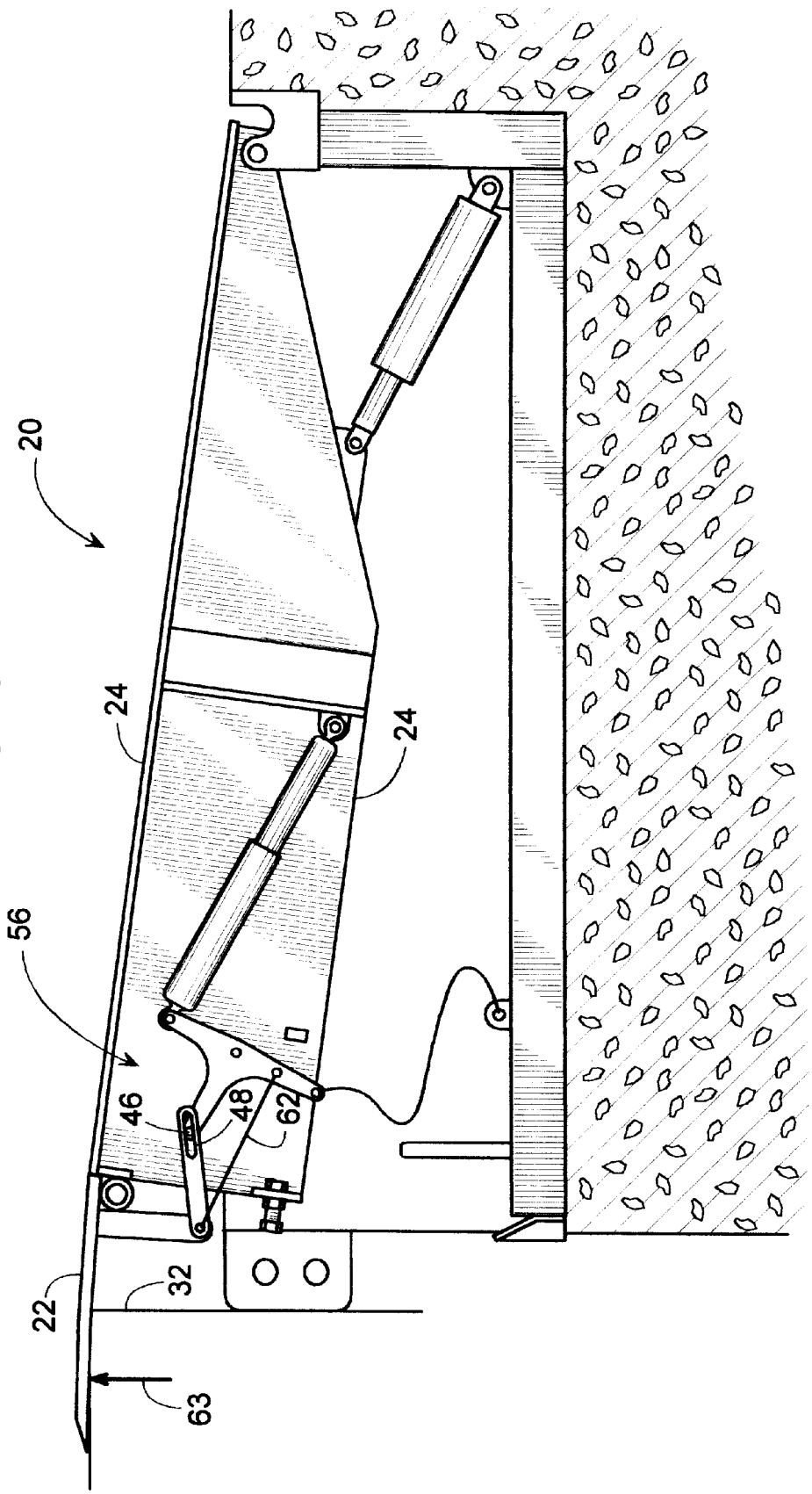
FIG. 6 shows a toggle-over-center mechanism unlatching the lip.

Once latched, the over-toggle position of main link member 40 and lip link member 44 holds lip 22 in a latched mode. Member 44 exerting a holding force 61 against lug 52 holds lip 22 substantially fixed relative to ramp 24, regardless of any tension in snubbing member 38. This ensures that lip 22 remains extended over the back edge of the vehicle, as ramp 24 pivots downward, as shown in FIG. 5. As ramp 22 descends farther, as shown in FIG. 6, the underside of lip 22 engages vehicle 32. For example, lip 22 might rest upon the back end of a trailer bed of a truck.

Vehicle 32 abutting lip 22 may, in effect, rotate lip 22 slightly upward relative to ramp 24. The relative rotational motion could cause a release link 62 (e.g., a slidable bar or a pliable elongated member, such as a chain or a cable) to pull mechanism 56 into its unlatched configuration. In other words, an engagement force 63 created by lip 22 engaging vehicle 32 is used or transmitted to another member (e.g., member 52, 44 and/or 40) for positively unlatching lip 22. Of course, the magnitude and direction of force 63 can vary upon being transmitted to other members. The basic concept of using engagement force 63 to positively and directly move member 56 to an unlatched position can be carried out by a variety of structures too numerous to mention. However, as one example, release link 62 connects lip lug 52 to main link 40, so as lip 22 pivots upward relative to ramp 24, the resulting rotation of lug 52 pulls on link 62 to force main link 40 to rotate clockwise about pin 42, thus moving main link 40 and lip link 44 to an under-toggle position. In this example, the action is facilitated by pin 46 being free to slide within slot 48. With dock leveler 20 in the position shown in FIG. 6, vehicle 32 may now be loaded or unloaded, if desired.

Figure 7:
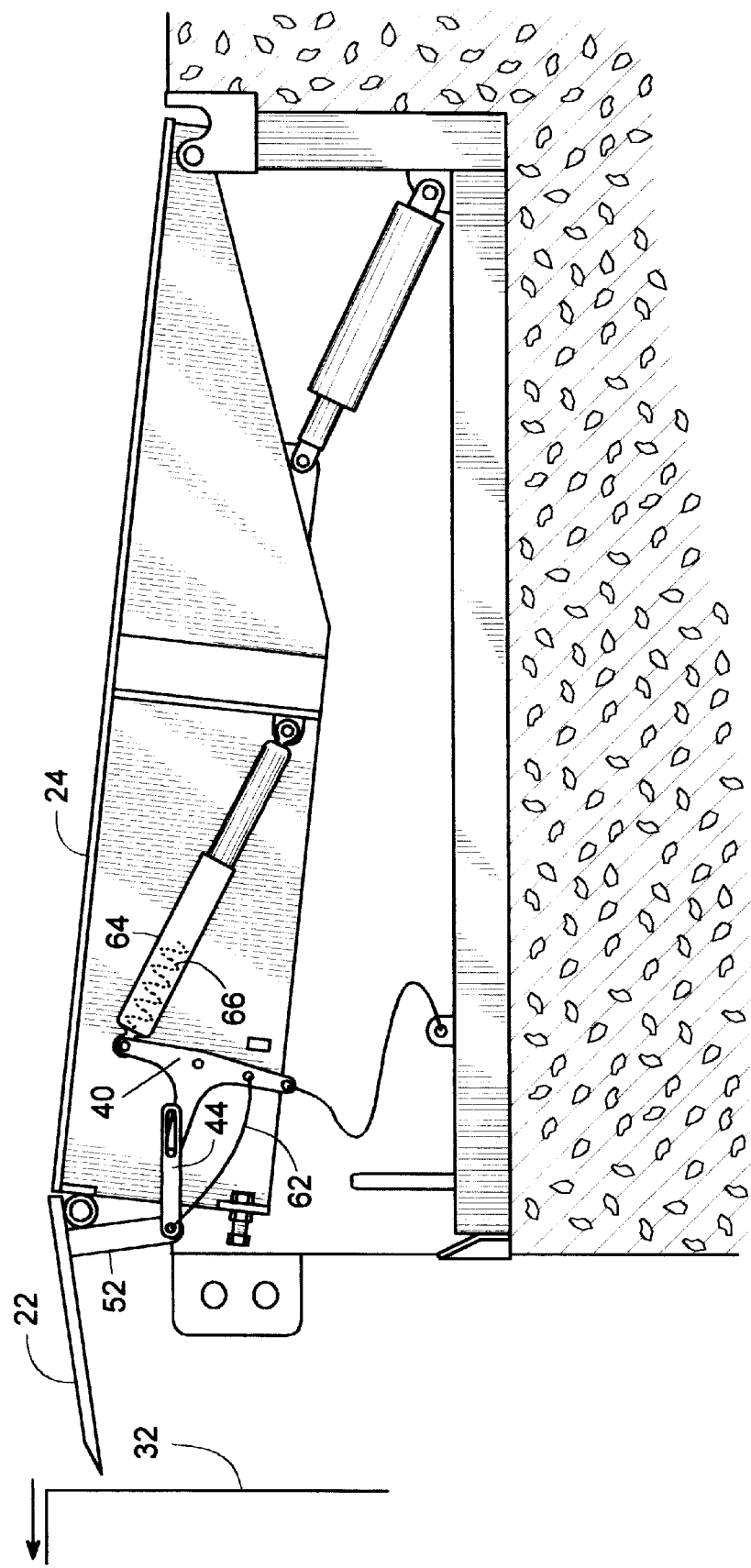
FIG. 7 shows the ramp and an unlatched lip descending as the truck departs.

When vehicle 32 departs, as shown in FIG. 7, lip 22 drops slightly, as allowed by the travel of pin 46 within slot 48. This removes the tension in release link 62 and allows lip 22 to descend while in an unlatched mode. Now lip 22 and ramp 24 are both free to pivot downward to the position shown in FIG. 2 and eventually return to its standby position of FIG. 1.

To prevent lip 22 from undergoing rapid descent, a dampener 64 can be added to dampen the motion (i.e., reduce the velocity) of at least one of lip 22, lip lug 52, lip link 44, or main link 40. For example, in one embodiment, dampener 64 is a piston/cylinder arrangement with an integral spring 66 (FIG. 7) that helps counteract the weight of lip 22. Spring 66 could be a mechanical compression spring, or dampener 64 could be a gas spring providing both functions of dampening motion and counteracting the weight of lip 22. In one embodiment, dampener 64 is a fluid-filled piston/cylinder such that compression of the cylinder results in fluid flow through a size-controlled orifice to reduce the velocity of clockwise rotation of link 40.

Figure 8:
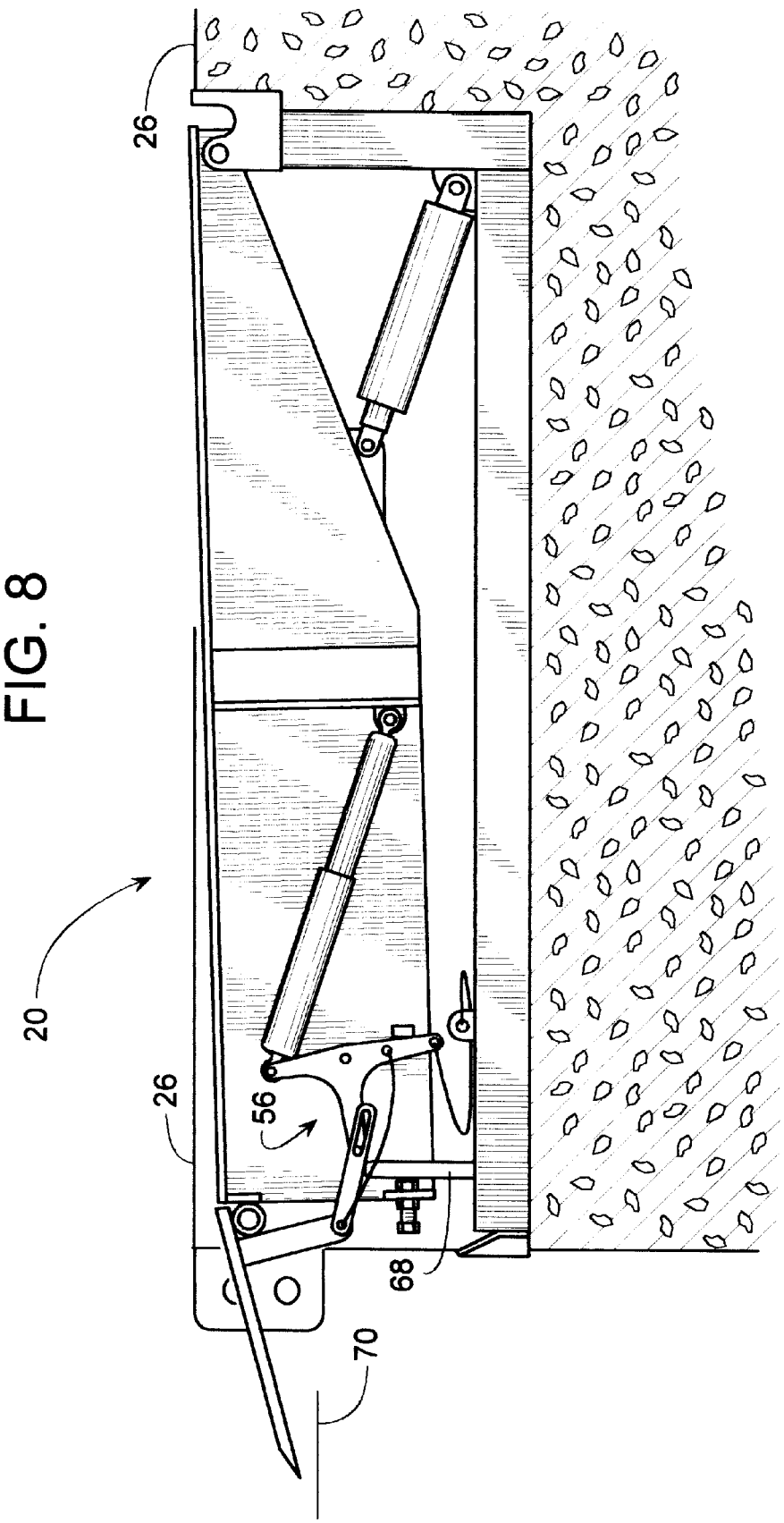
FIG. 8 shows a latched lip that missed the truck.
Figure 9:
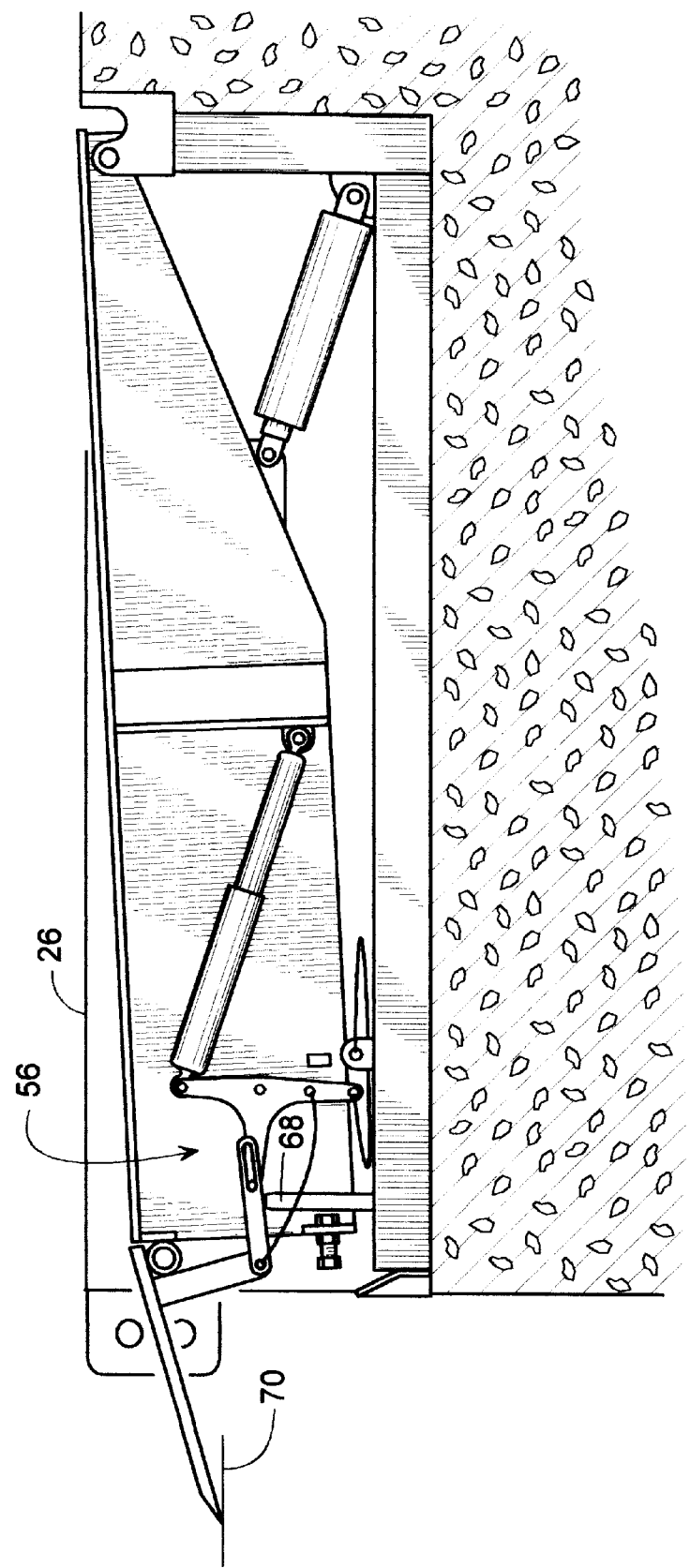
FIG. 9 shows the dock leveler itself forcing the toggle mechanism to unlatch the lip.

Returning to FIG. 5, where ramp 24 is descending with lip 22 latched, it is possible that lip 22 may miss vehicle 32. For example, vehicle 32 may be improperly parked or may not even be present at dock 26. In such a case, vehicle 32 would not unlatch lip 22; thus ramp 24 and latched lip 22 could descend to a predetermined lower limit 70, as shown in FIGS. 8 and 9. To address this situation, lip 22 is unlatched by a mechanism other than the vehicle.

For example, in one embodiment, a travel limiting member 68 obstructs continued downward movement of ramp 24 once ramp 24 reaches its lower limit 70. In this example, member 68 is situated under ramp 24 to engage mechanism 56 to forcible unlatch it automatically (i.e., without additional intervention from a vehicle 32 or an operator). Obstructing member 68 engaging the underside of links 40 or 44 unlatches lip 22 by forcing main link 40 to rotate clockwise, so mechanism 56 toggles through the center position (toggle position) wherein pivots 50, 46 and 42 are collinear to an under-toggle position wherein pivot 46 is above a line connecting pivots 50 and 42 as shown in FIG. 9. This unlatching operation is illustrated by dock leveler 20 moving from the position shown in FIG. 8 to that of FIG. 9.

Figure 10:
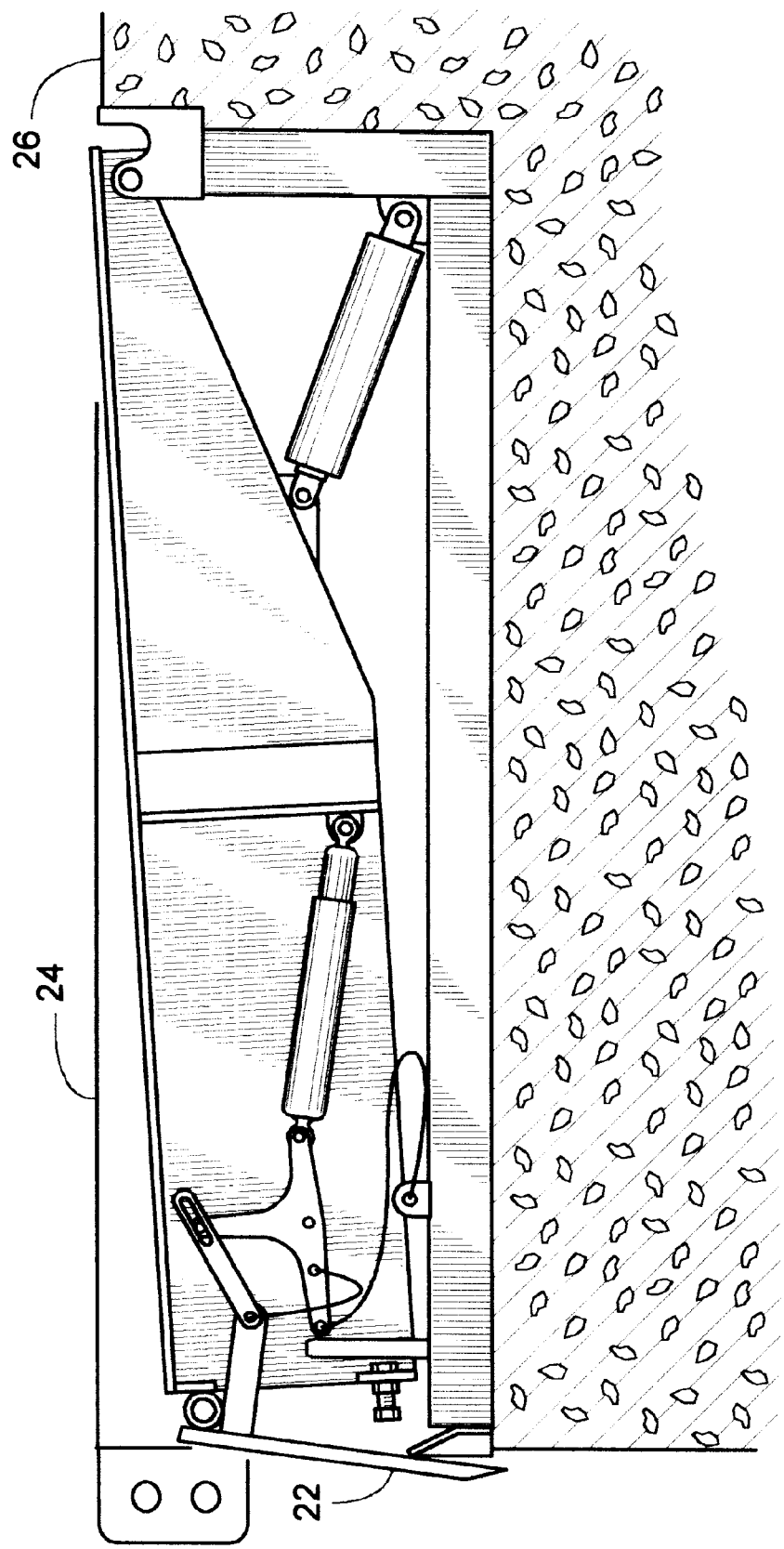
FIG. 10 shows an unlatched lip with the ramp pivoted below the loading dock platform.

When lip 22 is unlatched by obstructing member 68, dock leveler 20 will eventually reach the position of FIG. 10. From this extremely low position, ramp 24 can be raised slightly and then re-lowered to its standby position of FIG. 1. This final operation might be carried out by an operator manipulating some control or performed automatically in response to a limit switch sensing that lip 22 or ramp 24 has reached some predetermined low position with the lip in a pendant or near-pendant position.

Although the invention is described with respect to a preferred embodiment, modifications thereto will be apparent to those skilled in the art. Therefore, the scope of the invention is to be determined by reference to the claims that follow.

I claim:

1. A dock leveler adapted to engage a vehicle, comprising:
   a frame;
   a ramp pivotally coupled to the frame;
   a lip pivotally coupled to the ramp; and,
   a mechanical latch having latched mode where the lip is prevented from downward rotation relative to the ramp by the mechanical latch, the mechanical latch having an unlatched mode where the lip is pivotal relative to the ramp, the latch transferring from the latched mode to the unlatched mode in response to at least the ramp descending to a predetermined lower limit in the event that the lip happens to avoid making contact with the vehicle.

2. The dock leveler of claim 1, further comprising a lip lug rigidly extending from the lip; and a lip link coupled to the lip lug, the lip link selectively exerting a first force to control a descent speed of the lip and a second force to maintain the lip in the latched mode.

3. The dock leveler of claim 1, further comprising a lip link coupled to the lip; and a main link coupled to the lip link, the main link and the lip link comprising a toggle-over-center mechanism having a latched configuration and an unlatched configuration that determines the latched mode and the unlatched mode respectively.

4. The dock leveler of claim 3, further comprising a release link coupled to move the toggle-over-center mechanism from the latched configuration to the unlatched configuration in response to the lip pivoting upward with respect to the ramp.

5. The dock leveler of claim 4, wherein the release link is an elongated pliable member.

6. The dock leveler of claim 5, wherein the release link is a chain.

7. The dock leveler of claim 5, wherein the release link is a cable.

8. The dock leveler of claim 4, wherein the release link is coupled between the lip and the main link.

9. The dock leveler of claim 4, further comprising a lip lug rigidly extending from the lip and coupling the lip link to the lip, and wherein the release link couples the lip lug to the main link.

10. The dock leveler of claim 3, further comprising an elongated snubbing member acting upon the main link to urge the lip to pivot outward in response to the ramp pivoting upward.

11. The dock leveler of claim 1, further comprising a dampener coupled to dampen movement of the lip in the unlatched mode.

12. The dock leveler of claim 11, wherein the dampener includes an integral spring that at least partially counteracts downward movement of the lip in the unlatched mode.

13. The dock leveler of claim 1, further comprising a travel limiting member that establishes the predetermined lower limit.

14. The dock leveler of claim 3, further comprising a travel limiting member disposed under the ramp, wherein the lip transfers to the unlatched mode upon the toggle-over-center mechanism descending into engagement with the travel limiting member.

15. The dock leveler of claim 13, wherein the travel limiting member is disposed under the ramp.

16. A clock leveler adapted to engage a vehicle, comprising:
a frame;
a ramp pivotally coupled to the frame;
a lip pivotally coupled to the ramp and having a distal end adapted to engage the vehicle; and
a latching mechanism permanently coupled to the lip and ramp and having a latched mode and an unlatched mode, wherein the latching mechanism prevents the lip from downward rotation relative to the ramp in the latched mode and allows the lip to pivot relative to the ramp in the unlatched mode, the latch mechanism being moved to its unlatched mode by a force originating at the distal end of the lip upon engaging the vehicle such that the lip pivots downward relative to the ramp when the vehicle and the lip separate.

17. The dock leveler of claim 16, further comprising a lip link coupled to the lip and selectively transmitting a first force that controls a speed of descent of the lip in the unlatched mode and transmitting a second force that maintains the lip in the latched mode.

18. The dock leveler of claim 16, wherein the latching mechanism changes from the latched mode to the unlatched mode in response to at least the ramp descending to a predetermined lower limit in the event that the lip does not contact the vehicle.

19. The dock leveler of claim 17, further comprising a main link coupled to the lip link to provide a toggle-over-center mechanism having a latched configuration and an unlatched configuration that at least partially determines the latched mode and the unlatched mode respectively.

20. The dock leveler of claim 19 further comprising a release link coupled to move the toggle-over-center mechanism from the latched configuration to the unlatched configuration in response to the lip pivoting upward with respect to the ramp.

21. The dock leveler of claim 20, wherein the release link is an elongated pliable member.

22. The dock leveler of claim 20, wherein the release link is coupled between the lip and the main link.

23. The dock leveler of claim 20, further comprising a lip lug idly extending from t he lip and coupling the lip link to the lip, and wherein the release link couples the lip lug to the main link.

24. The dock leveler of claim 19, further comprising an elongated snubbing member acting upon the main link to urge the lip to pivot upward in response to the ramp pivoting upward.

25. The dock leveler of claim 16, further comprising a dampener coupled to the lip to dampen movement of the lip in the unlatched mode, the dampener including an integral spring that at least partially counteracts downward movement of the lip in the unlatched mode.

26. The dock leveler of claim 18, further comprising a travel limiting member that at least partially establishes the predetermined lower limit.

27. The dock leveler of claim 26, wherein the travel limiting member is disposed under the ramp.

28. A method of operating a dock leveler that includes a ramp from which a lip is pivotally coupled and adapted to engage a vehicle, comprising:
positioning a member to a latched position where the member exerts a holding force that prevents the lip from rotating downward relative to the ramp;
pivoting the ramp downward so that the lip engages the vehicle to create an engagement force; and
transmitting the engagement force to the member, thereby moving the member away from the latched position to allow the lip to rotate downward relative to the ramp when the lip and the vehicle separate while maintaining a mechanical connection between the member and the lip.

29. The method of claim 28, further comprising applying a dampening force to the member when the member is away from the latched position, thereby limiting the velocity at which the lip rotates downward.

30. A dock leveler as defined in claim 1, wherein the latch transfers to the unlatched mode when the lip descends to a second predetermined lower limit.

31. A dock leveler adapted to engage a vehicle, comprising:
- a frame;
- a ramp pivotally coupled to the frame;
- a lip pivotally coupled to the ramp; and,
- a mechanical latch having a latched mode where the lip is prevented from downward rotation relative to the ramp by the mechanical latch, the mechanical latch having an unlatched mode where the lip is pivotal relative to the ramp the latch transferring from the latched mode to the unlatched mode in response to at least the lip descending to a predetermined lower limit in the event that the lip happens to avoid making contact with the vehicle.

32. A dock leveler adapted to engage a vehicle, comprising:
- a frame;
- a ramp pivotally coupled to the frame;
- a lip pivotally coupled to the ramp; and,
- means for mechanically latching the lip, the latching means having a latched mode where the lip is prevented from downward rotation relative to the ramp by the latching means, the latching means having an unlatched mode where the lip is pivotal relative to the ramp, the latching means transferring from the latched mode to the unlatched mode in response to at least the ramp descending to a predetermined lower limit in the event that the lip happens to avoid making contact with the vehicle.

33. A dock leveler adapted to engage a vehicle, comprising:
- a frame;
- a ramp pivotally coupled to the frame;
- a lip pivotally coupled to the ramp; and,
- means for mechanically latching the lip, the latching means having a latched mode where the lip is prevented from downward rotation relative to the ramp by the latching means, the latching means having an unlatched mode where the lip is pivotal relative to the ramp, the latching means transferring from the latched mode to the unlatched mode in response to at least the lip descending to a predetermined lower limit in the event that the lip happens to avoid making contact with the vehicle.

34. A dock leveler adapted to engage a vehicle, comprising:
- a frame;
- a ramp pivotally coupled to the frame;
- a lip pivotally coupled to the ramp, the lip having a latched mode where the lip is prevented from downward rotation relative to the ramp, the lip having an unlatched mode where the lip is pivotal relative to the ramp, the lip transferring from the latched mode to the unlatched mode in response to at least the ramp descending to a predetermined lower limit in the event that the lip happens to avoid making contact with the vehicle;
- a lip lug rigidly extending from the lip; and
- a lip link coupled to the lip lug, the lip link selectively exerting a first force to control a descent speed of the lip and a second force to maintain the lip in the latched mode.

35. A dock leveler adapted to engage a vehicle, comprising:
- a frame;
- a ramp pivotally coupled to the frame;
- a lip pivotally coupled to the ramp, the lip having a latched mode where the lip is prevented from downward rotation relative to the ramp, the lip having an unlatched mode where the lip is pivotal relative to the ramp, the lip transferring from the latched mode to the unlatched mode in response to at least the lip descending to a predetermined lower limit in the event that the lip happens to avoid making contact with the vehicle;
- a lip lug rigidly extending from the lip; and
- a lip link coupled to the lip lug, the lip link selectively exerting a first force to control a descent speed of the lip and a second force to maintain the lip in the latched mode.

36. A dock leveler adapted to engage a vehicle, comprising:
- a frame;
- a ramp pivotally coupled to the frame;
- a lip pivotally coupled to the ramp, the lip having a latched mode where the lip is prevented from downward rotation relative to the ramp, the lip having an unlatched mode where the lip is pivotal relative to the ramp, the lip transferring from the latched mode to the unlatched mode in response to at least the ramp descending to a predetermined lower limit in the event that the lip happens to avoid making contact with the vehicle;
- a lip link coupled to the lip; and
- a main link coupled to the lip link, the main link and the lip link comprising a toggle-over-center mechanism having a latched configuration and an unlatched configuration that determines the latched mode and the unlatched mode respectively.

37. A dock leveler adapted to engage a vehicle, comprising:
- a frame;
- a ramp pivotally coupled to the frame;
- a lip pivotally coupled to the ramp, the lip having a latched mode where the lip is prevented from downward rotation relative to the ramp, the lip having an unlatched mode where the lip is pivotal relative to the ramp, the lip transferring from the latched mode to the unlatched mode in response to at least the lip descending to a predetermined lower limit in the event that the lip happens to avoid making contact with the vehicle;
- a lip link coupled to the lip; and
- a main link coupled to the lip link, the main link and the lip link comprising a toggle-over-center mechanism having a latched configuration and an unlatched configuration that determines the latched mode and the unlatched mode respectively.

38. The dock leveler of claim 16, wherein the latching, mechanism changes from the latched mode to the unlatched mode in response to at least the lip descending to a predetermined lower limit in the event that the lip does not contact the vehicle.

39. A dock leveler adapted to engage a vehicle, comprising:
- a frame;
- a ramp pivotally coupled to the frame;
- a lip pivotally coupled to the ramp and having a distal end adapted to engage the vehicle; and
- a latching mechanism permanently coupled to the lip via a linkage and having a latched mode and an unlatched mode, wherein the latching mechanism prevents the lip from downward rotation relative to the ramp in the latched mode and allows the lip to pivot relative to the ramp in the unlatched mode, the latch mechanism being moved to its unlatched mode by upward movement of the distal end of the lip resulting from the lip engaging the vehicle.

* * * * *

UNITED STATES PATENT AND TRADEMARK OFFICE
CERTIFICATE OF CORRECTION

PATENT NO. : 6,311,352 B1
DATED : November 6, 2001
INVENTOR(S) : Scott L. Springer It is certified that error appears in the above-identified patent and that said Letters Patent is hereby corrected as shown below:

<u>Column 5,</u>
Line 56, after "A", delete "clock" and insert -- dock --.

<u>Column 6,</u>
Line 29, after "...lug", delete "idly" and insert -- rigidly --.
Line 29, after "...from", delete "t he" and insert -- the --.

Signed and Sealed this

Twenty-first Day of May, 2002

Attest:

JAMES E. ROGAN
*Attesting Officer*  *Director of the United States Patent and Trademark Office*